United States Patent [19]
Lewis, Jr. et al.

[11] 3,821,359

[45] June 28, 1974

[54] TITANIUM DIOXIDE PIGMENTS

[75] Inventors: Joseph Earle Lewis, Jr., Brighton, England; George Leathwhite Roberts, Jr., Lynchburg, Va.

[73] Assignee: American Cyanamid Company, Stamford, Conn.

[22] Filed: July 30, 1970

[21] Appl. No.: 64,120

Related U.S. Application Data

[63] Continuation of Ser. No. 849,280, Aug. 5, 1969, abandoned, which is a continuation of Ser. No. 662,595, Aug. 23, 1967, abandoned.

[52] U.S. Cl. .............................. 423/610, 106/300
[51] Int. Cl. ...................... C01g 23/04, C01g 23/08
[58] Field of Search....... 23/202 R, 202 V; 106/300; 423/610

[56] References Cited
UNITED STATES PATENTS

| | | | |
|---|---|---|---|
| 2,091,955 | 9/1937 | Allan | 23/202 R X |
| 2,304,110 | 12/1942 | McKinney et al. | 23/202 R |
| 3,442,678 | 5/1969 | Ross | 106/300 |
| 3,567,478 | 3/1971 | Dietz et al. | 106/300 |

*Primary Examiner*—Edward Stern
*Attorney, Agent, or Firm*—Roland A. Dexter

[57] ABSTRACT

This invention relates to the preparation of titanium dioxide pigment and has as its principal object the production of titanium dioxide pigment of improved tinting strength and tint tone. In particular, the present invention relates to a process for the preparation of $TiO_2$ in pigmentary form which comprises forming a slurry of particulate $TiO_2$ in hydrofluoric acid, allowing the slurry to stand until at least some of the slurried solids have been dissolved, and thereafter recovering the resulting titanium dioxide pigment of reduced particle size, improved tinting strength and bluer tint tone.

7 Claims, No Drawings

TITANIUM DIOXIDE PIGMENTS

This Application is a streamlined continuation of U.S. Patent Application, Ser. No. 849,280 filed Aug. 5, 1969, now abandoned, which Application in turn was a continuation of U.S. Pat. Application Ser. No. 662,595, filed Aug. 23, 1967, also now abandoned.

This invention relates to the preparation of titanium dioxide pigment and has as its principal object the production of titanium dioxide pigment of improved tinting strength and tint tone. More particularly, the invention is concerned with the wet finishing of titanium dioxide pigment utilizing chemical means. Still more particularly, the invention relates to the wet finishing of titanium dioxide pigment in the presence of hydrofluoric acid whereby the tinting strength and tint tone of the titanium dioxide pigment is improved without the need to resort to conventional mechanical milling procedures.

As is known, pigmentary titanium dioxide ($TiO_2$) is commercially manufactured by one of two processes. One process involves the vapor phase oxidation of a titanium halide, such as titanium tetrachloride, to obtain a titanium dioxide product which may require a grinding or milling treatment to obtain a smooth-textured pigment product of uniform particle size. The other process for preparing pigmentary $TiO_2$ involves leaching a titaniferous ore with sulfuric acid, separating the titanium sulfate and hydrolyzing it to obtain hydrous $TiO_2$ which is then washed and finally calcined. The product resulting from the calcination operation is not of uniform particle size and is conventionally subjected to either a milling or a grinding operation to break down agglomerates and effect particle size reduction and thereby improve the tinting strength and tint tone of the $TiO_2$ particles. However, these procedures are not wholly satisfactory as finishing operations. For instance, grinding devices are costly to purchase and install. Large equipment can often handle only relatively small capacities. Moreover, due to caking in the mill, the particles are not all subjected to the same grinding conditions, and uniformity is not easily obtained. There is thus a need for an improved means for producing $TiO_2$ of uniformly small particle size and high tinting strength and desirable tint tone.

It is an object of this invention to provide a means for treating $TiO_2$ for pigmentary use without the need for mechanical grinding. It is a further object of this invention to provide an improved method for obtaining pigmentary $TiO_2$ of good tinting strength and tint tone.

In accordance with this invention there is provided a chemical, rather than mechanical technique for treating $TiO_2$. This invention is based upon the discovery that controlled used of aqueous hydrofluoric acid can effect desired particle size reduction and thus enhance the tint tone and tinting strength of the treated $TiO_2$ material. The treatment with aqueous HF advantageously involves merely admixing the $TiO_2$ and aqueous HF and allowing the mixture to age until the desired uniformity and size reduction are achieved. Thereafter, the $TiO_2$ is filtered and washed. Further conventional finishing treatments may be applied if desired, and it is then dried and milled to give the product of improved properties.

The fundamental basis of the present invention is the provision of a chemical means for reducing aggregate size. This is somewhat akin to the practice of breaking aggregates and floccules of organic pigments by the use of dispersing agents to reduce the crystal energy. In this case, a much stronger chemical attack is necessary since the high temperature heat treatment of the $TiO_2$ formation process gives aggregates which are highly sintered and very difficult to break up by the use of conventional milling equipment and dispersing agents. The critical part of the invention is that the combination of acid concentration and the time and temperature of treatment must be such that a portion of the solid is dissolved.

Higher acid concentrations, longer periods of treatment and higher temperatures generally lead to the solution of greater amounts of material and increased particle size reduction. Conditions should be adjusted so that the desired degree of size reduction will be obtained in the planned time of acid treatment. Even dilute HF can be used if the $TiO_2$-HF slurry is heated for a long time. However, it is preferred to use HF of at least 15 percent concentration so that the desired reduction can be effected in a reasonable time, i.e., in less than 48 hours. It is likewise desirable for practical purposes to adjust acid strength to a level such that particle size reduction can be effected within the range of room temperature to the boiling temperature at atmospheric pressure of the $TiO_2$ slurry. Accordingly, for practical purposes, when using an acid solution of 25–50 percent concentration, it is preferred to employ from about 1 to 10 parts of acid for each part of $TiO_2$ starting material, and to conduct the acid treatment at a temperature of 20°C. to 95°C. for about 15 minutes to 24 hours. Since, as noted above, the desired particle size reduction obtained by the practice of this invention is the result of the dissolving action of the hydrofluoric acid, it is possible to express the criteria of treatment in terms of the amount of $TiO_2$ which is dissolved. In general, for reasons of economy, treatment should not result in the dissolution of more than 50 percent of the $TiO_2$ starting material. On the other hand, if less than about 1 percent of the $TiO_2$ starting material is dissolved, then the amount of size reduction may be insufficient. Dissolution in the range of 5–50 percent, and preferably less than 40 percent, of the $TiO_2$ starting material, will normally mean that the desired degree of particle size reduction has been achieved with only a minor sacrifice of economy. However, the $TiO_2$, which is dissolved, can be recovered by precipitation technique and reprocessed to finished pigment by several routes.

Advantageously, the presence of other materials, such as nitric acid, oxalic acid, acetic acid or acetyl acetone, usually from 1 percent to 90 percent (depending upon the material) based on the weight of hydrofluoric acid, can, if desired, be added to the hydrofluoric acid treating solution so as to dilute the latter. Notwithstanding such dilution, good tint tones of the resultant titanium dioxide pigment are observed.

The tinting strength of the pigment is determined by admixing the pigment with castor oil, linseed oil or ricinoleic acid, or an equivalent thereof, to form a paste and then adding carbon black in increments until the paste sample matches a standard paste prepared from commercial titanium dioxide and a specified amount of carbon black. The tinting strength is reported as a number which represents the relative optical efficiency of the pigments compared to a sample of basic carbonate of white lead which was rated at 100. The tint tone represents the observed difference from the standard in terms of brownness (Br) or blueness (Bl) on a scale from Br-6 to Bl-6. A tint tone shift from brown to blue indicates a decrease in the diameter of the pigment particles.

As hereinabove stated, the hydrofluoric acid treatment of the present invention is equally applicable to titanium dioxide pigments obtained by the calcination of hydrolysates of titanium sulfate solutions, and to pigments obtained by the oxidation of titanium tetrachloride. The products obtained from both processes contain substantial amounts of coarse particles and both can be improved by the practice of this invention. The process can also be used to augment conventional processes aimed at effecting particle size reduction. Thus instead of replacing a milling operation with acid treatment, it is possible to add acid either during milling, or after milling, to the milled product.

The following Examples are presented to illustrate the preferred practice of this invention. They are merely illustrative and are not to be taken as limiting the invention. Unless otherwise stated, parts are by weight.

EXAMPLE 1

Twenty grams of micropulverized calciner discharge were slurried with 100 ml. of 49.5 percent aqueous hydrofluoric acid. The mixture was allowed to stand at room temperature for three hours. The aged slurry was filtered, and the cake was washed with water and oven-dried. The tinting strength and tint tone of the dried pigment were determined to be 1,500 and Br-3, respectively. The calcined titanium dioxide before treatment exhibited a tinting strength and tint tone as 1,420 and Br-6, respectively.

EXAMPLE 2

The procedure of Example 1 was repeated in every detail except that the slurried mixture was allowed to stand for five hours. The tinting strength and tint tone of the finished product were: 1,550 and Br-1, respectively.

EXAMPLE 3

30 Grams calcined titanium dioxide having a tinting strength and tint tone of 1,420 and Br-6, respectively, were slurried with 105 ml. of aqueous 49.5 percent hydrofluoric acid and 5 ml. of water and allowed to stand for 18.5 hours at room temperature. The aged slurry was filtered and the cake was washed with water and oven-dried. Examination of the treated titanium dioxide revealed a tinting strength and a tint tone of 1645 and Bl-2, respectively.

EXAMPLE 4

Repeating the procedure of Example 3 in every detail, except for the use of 50 ml. of the aqueous hydrofluoric acid and a treatment time of 21 hours, there was obtained a $TiO_2$ product having a tinting strength and tint tone of 1650 and Bl-1, respectively.

EXAMPLE 5

50 Grams of calcined titanium dioxide were added to 50 ml. of 35 percent hydrofluoric acid. The temperature was raised to 75°C. for about 30 minutes. The aged slurry was diluted with water, filtered, and the cake was water-washed and oven-dried. There was obtained 31.3 g. of dried $TiO_2$ pigment which was characterized by a tinting strength and tint tone of 1620 and Bl-2, respectively, as compared to 1420 and Br-6 for the untreated calcined $TiO_2$ pigment.

EXAMPLE 6

Separate portions (20 grams each) of $TiO_2$ slurry prepared by the procedure of Example 5 were treated with (a) 5 g. acetyl acetone, (b) 5 g. oxalic acid and (c) 10 g. dextrose, respectively. The product was filtered, and the cake was washed as in Example 5. The resultant pigments had the following tinting strengths and tint tones: (a) 1630 and Bl-2, (b) 1610 and Bl-2 and (c) 1610 and Bl-1.

EXAMPLE 7

5 g. $TiO_2$ were slurried with a mixture of 1.25 ml. of 49 percent HF and 7 ml. of concentrated nitric acid for 16.5 hours at 80°C. The resultant mixture was filtered, and the cake was water-washed and dried. The pigment thus obtained possessed a tinting strength and tint tone of 1500 and Bl-2, respectively, as compared to a tinting strength and a tint tone of 1420 and Br-6, respectively, for the untreated pigment.

EXAMPLE 8

Fifty g. $TiO_2$ prepared by oxidizing $TiCl_4$ at high temperature were added to 100 ml. of $H_2O$ and 5 ml. of 49.5 percent HF. The slurry was heated for 1.25 hours at 60°C., during which time it evaporated to near dryness. 45 g. of a dry powder were obtained which had a tinting strength of 1670 Br-1 compared to a tinting strength of 1630 Br-2 for the starting material.

EXAMPLE 9

Ten g. micropulverized calciner discharge were added to 100 ml. of 49.5 percent HF and allowed to stand for 22 hours at room temperature. The aged slurry was filtered, the cake was washed with water and dried at 110°C. 0.9 g. of solid was obtained (approximately 9 percent).

EXAMPLE 10

A sample of anatase calciner discharge (60 g.) was slurried in 30 ml. water in a polyethylene beaker at 80°–90°C. Hydrofluoric acid (50 ml. of 49.5 percent acid) was then added and the resulting flocculated slurry was allowed to remain in the bath for one hour. The aged slurry was filtered and washed with water at room temperature. The tinting strength and tint tone reported of the residue (40 g.) were 1300 and Bl-4, respectively, compared to 1320 and Br-2 for the starting material.

EXAMPLE 11

A sample of $TiO_2$ prepared by the oxidation of titanium tetrachloride (40 g.) at high temperature, was slurried in 50 ml. hydrofluoric acid (49.5%) and allowed to stand at room temperature for 19 hours. The residue of titanium dioxide (24 g.) was washed with water. The tinting strength and tint tone of this residue were 1650 and Bl-3 compared to 1630 and Br-2 for the starting material.

EXAMPLE 12

A sample of $TiO_2$ prepared by the calcination of a hydrous titanium dioxide (50 g.) was slurried in 50 ml. of 49.5% hydrofluoric acid and immediately heated at 60°–70°C. for one half hour. The solid residue (31 g.) was collected and washed with water. The tinting strength and tint tone of this residue was 1620 Bl–2 as compared to 1480 and Br–5 for the starting material.

We claim:

1. A process for the wet finishing of anhydrous $TiO_2$ in pigmentary form which comprises slurrying calcined anhydrous titanium dioxide pigmentary particles in an aqueous solution of 15 to 50 percent by weight of hydrofluoric acid, allowing said slurry to age for at least 15 minutes at a temperature of from 20° to 80°C until from 5 percent to 50 percent by weight of the slurried titanium dioxide has been dissolved, thereafter directly filtering the residual titanium dioxide pigment from said strongly acid slurry and washing said pigment whereby a pigment of reduced particle size and improved tinting strength and bluer tint tone is obtained.

2. The process according to claim 1 wherein the hydrofluoric acid has a concentration of 35 percent to 50 percent.

3. The process according to claim 1 wherein from one to ten parts of acid are used for each part of $TiO_2$ pigment.

4. The process according to claim 1 wherein conditions are such that 5–15 percent of the $TiO_2$ is dissolved by the hydrofluoric acid solution.

5. The process according to claim 1 wherein a physical milling treatment is employed in conjunction with said hydrofluoric acid treatment.

6. The process according to claim 5 wherein the treatment with hydrofluoric acid is conducted simultaneously with said milling treatment.

7. The process according to claim 5 wherein the treatment with hydrofluoric acid is prior to said milling treatment.

* * * * *